United States Patent [19]

Asai et al.

[11] Patent Number: 4,887,687

[45] Date of Patent: Dec. 19, 1989

[54] MOTORCYCLE FRAME

[75] Inventors: Susumu Asai, Kawagoe; Haruhide Sugimoto, Urawa; Masaru Fujisaki, Tokyo; Tadatoshi Shigetomi, Kawagoe; Hisatoshi Kobayashi, Tokyo, all of Japan

[73] Assignee: Honda Giken Kogyo Kabushiki Kaisha, Tokyo, Japan

[21] Appl. No.: 207,967

[22] Filed: Jun. 17, 1988

[30] Foreign Application Priority Data

| Jun. 19, 1987 | [JP] | Japan | 62-152604 |
| Jun. 19, 1987 | [JP] | Japan | 62-152601 |
| Jun. 19, 1987 | [JP] | Japan | 62-152602 |
| Jun. 19, 1987 | [JP] | Japan | 62-152603 |
| Jun. 19, 1987 | [JP] | Japan | 62-152605 |

[51] Int. Cl.$^4$ .................................... B62K 11/06
[52] U.S. Cl. ............................ 180/219; 280/281.1
[58] Field of Search .............. 180/219, 227, 228, 229; 280/281 R, 281.1

[56] References Cited

U.S. PATENT DOCUMENTS 4,265,330  5/1981  Silk et al. .................... 180/227 X
4,334,589  6/1982  Asakura et al. ............. 180/227 X Primary Examiner—John A. Pekar
Attorney, Agent, or Firm—Birch, Stewart, Kolasch & Birch

[57] ABSTRACT

A motorcycle frame is cast in two parts which are bolted together along the longitudinal centerline of the motorcycle. The frame has a transverse section in the form of an inverted "U", the space defined by the "U" being arranged to receive a motorcycle engine. An upper wall provides a separating partition between a fuel tank and the engine for defining a longitudinal space of reduced transverse sectional area towards the rear of the frame.

19 Claims, 11 Drawing Sheets

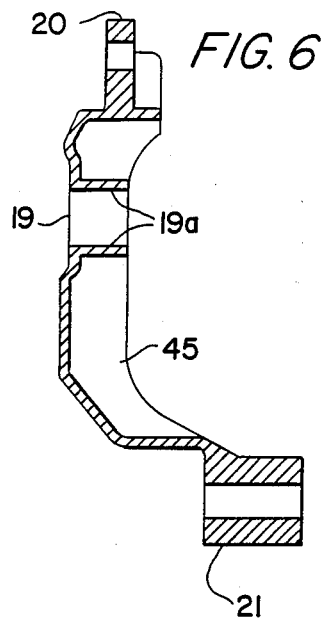
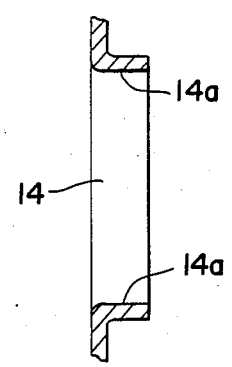
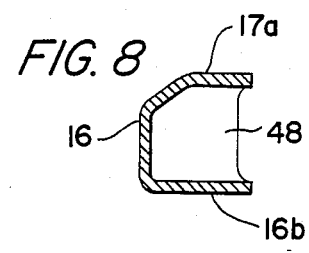
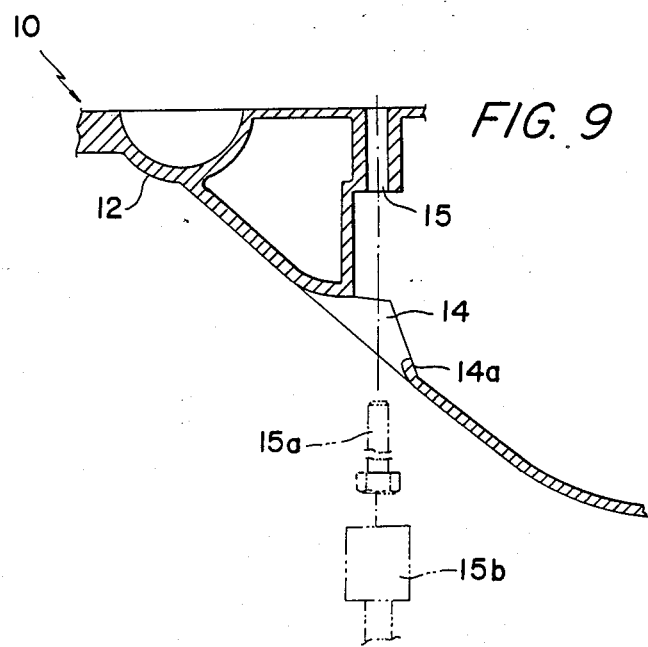

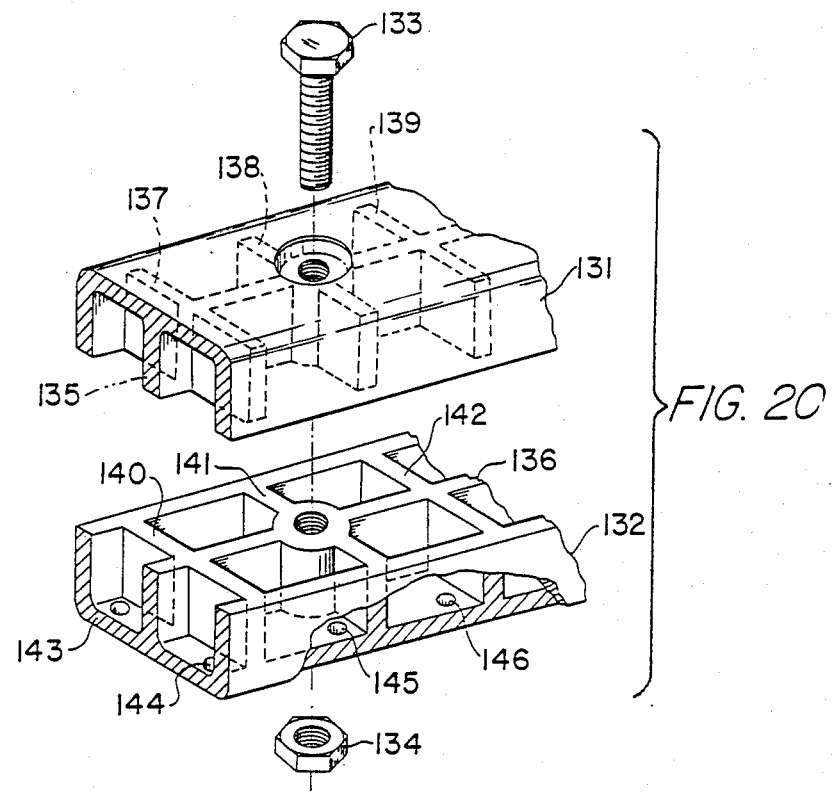

MOTORCYCLE FRAME

BACKGROUND OF THE INVENTION

1. Field of the Invention

The invention relates to motorcycle frames formed by casting and to motorcycles provided with such frames.

2. Description of Background Art

It is known that a frame for motorcycles may be cast and formed integrally from a light alloy such as aluminum or the like. It is also known to provide a pair of upper and lower ribs on side surfaces of a vehicle body frame. (See Japanese patent laid open No. 61-6084). Using such a process, it is possible to select the thickness of the frame which can thus be made to correspond to load distribution. Accordingly, appropriate distribution of strength can be attained and also appropriate resilience can be obtained by forming a relatively thin wall extending over a wide area. Moreover, frame rigidity may be improved by the side ribs whereby it is possible to reduce weight.

From Japanese patent laid open No. 61-215187, it is known to provide a motorcycle frame cast from aluminum and having a head pipe portion, a main frame portion and a mounting portion for a rear swing arm, wherein a side access port for a tool is formed in the main frame portion to provide access to a carburetor.

It is known from Japanese patent laid open No. 61-202983 to provide a motorcycle frame having a pair of left and right tubular frame members of rectangular cross section and formed of aluminum alloy. An air flow passage is defined by the frame members and a bottom surface of a fuel tank resting on the frame members, and a carburetor is arranged in the air flow passage to receive cooling air. In this arrangement the engine must be spaced sufficiently from the fuel tank to prevent excessive engine heat being transmitted to the fuel tank. Further, the two frame members project laterally from the sides of the engine beyond its width leading to a large overall transverse width.

Japanese patent laid open No. 61-215186 discloses a frame case from aluminum alloy with a pair of left and right frame portions, wherein a cross pipe is fitted between cavities formed in rear inwardly facing surfaces of the frame portions. On a bracket provided in a middle portion of the cross pipe is mounted an upper end of a rear cushion unit of a rear suspension. To a rear portion of the main frame a separate bracket is secured to act as a rear swing arm supporting portion. In this arrangement, the use of laterally spaced frame portions and the separate cross pipe leads to relatively large stress concentrations caused by loads from the rear cushion unit. The significant length of the cross pipe is disadvantageous in withstanding such loads. Further, since there are several separate parts, such as the bracket for supporting the rear swing arm, a bracket provided on the cross pipe and so forth, there are many steps on an assembly line.

Finally, it is known that a rear swing arm may be cast in aluminum or the like, for example, using partially a sand mould. (See Japanese patent laid open No. 61-125189). In this proposal, an arm portion is formed in a generally inverted "U" shape in transverse section and a number of transverse ribs are integrally provided in the "U" shaped space.

Viewed from one aspect, the invention provides a motorcycle frame formed by casting and having a transverse section in the form of an inverted "U", the frame being cast in two parts which are connected together substantially along the longitudinal centerline of the motorcycle.

In such an arrangement, the space between the arms of the "U" may be advantageously used to locate the motorcycle engine and other parts, while the "U" shape of the frame ensures sufficient rigidity. The arms of the "U" will thus normally define two side walls and there will be an upper wall extending between the side walls. Assembly of a motorcycle is facilitated by forming the frame in two parts.

Preferably, the frame further comprises a head pipe supporting portion, an engine supporting portion, and a rear swing arm supporting portion, wherein the frame is reinforced by a plurality of ribs the density of distribution of which varies, such ribs being most densely distributed at least in the rear swing arm supporting portion. The weight of the frame may thus be kept low by providing densely distributed reinforcing ribs in the rear swing arm supporting portion where they are most needed to withstand loads imposed during use of the motorcycle, and less densely distributed ribs in other areas where stresses are likely to be less.

If the frame is an aluminum casting formed by means of a sand mould, the lowest limit of the thickness is on the order of 4 mm, and therefore, the frame is relatively heavy in its weight. On the other hand, with an aluminum die casting process, the forming performance and strength is balanced when the thickness is about 2.5 mm. When the thickness exceeds 4 mm, cavities may be formed so that it is difficult to increase the strength of the product simply by increasing the thickness. The rib arrangement discussed above is thus particularly advantageous if the frame is formed as an aluminum die casting, since the ribs stiffen the frame structure as necessary without increasing the wall thickness of the frame.

SUMMARY AND OBJECTS OF THE INVENTION

In order to reduce its overall weight, the frame may be formed with one or more openings. In a preferred embodiment at least one opening is formed in the frame and such opening has a periphery defined by a re-entrant rib. The frame may thus be reduced in weight while the rib defining the periphery of the opening ensures that the frame is sufficiently rigid in this region.

Openings in the frame may also be provided to provide access for assembly, maintenance or the like, or to provide ventilation of the space defined by the "U" of the frame. In a preferred arrangement, the frame further comprises an air intake duct formed in an outer surface of one of the frame parts, and a connecting portion provided on said frame part for connection with the other frame part, wherein the duct is arranged such that a tool may be passed therethrough to gain access to the connection portion. Thus, the duct provides the dual purposes of receiving ventilating air, e.g., to cool the engine, and allowing access to the connecting portion for connecting together the two frame parts. Since the connecting portion is located inwardly of the duct, it does not affect the external appearance of the frame. The duct may have a periphery defined by a re-entrant rib.

Preferably, each frame part is provided at its rear with an integral thickened region arranged such that when the two frame parts are connected together, the thickened regions unite to define a mounting portion for a rear cushion unit, there being a space defined between the thickened regions wherein, in use, an upper end of the rear cushion unit is supported. By forming the mounting portion for a rear cushion unit from the two thickened regions of the connected together frame parts, loads transmitted from the cushion unit may be transmitted to both frame parts so as to be distributed over a substantial region rather than being concentrated. Furthermore, since the mounting portion formed by the two thickened regions is integral with the frame, the number of parts is small.

The thickened regions of the respective frame parts will normally be secured together by a bolt or the like, while the rear cushion unit will normally be supported by a pin. By keeping the distance between such a bolt and such a pin to a minimum, bending stresses on the mounting portion are reduced.

In a preferred embodiment, the frame includes an upper wall arranged to receive a fuel tank thereon, wherein in use the upper wall provides a separating partition between the fuel tank and an engine supported below the wall. Such a partition protects the fuel tank from engine heat so that the engine may be located nearer the fuel tank to save space. At the same time, of course, the upper wall is an integral part of the frame structure. By avoiding the use of a pair of separate longitudinal and laterally spaced tubular frame members each on a respective side of the engine, as known it the prior art, the frame width may be reduced.

A motorcycle having a frame with an upper wall preferably further comprises an engine disposed below the upper wall to define a longitudinal space between the upper wall and the engine which reduces in transverse sectional area towards the rear of the frame, a radiator disposed in front of the engine, and a carburetor at the rear of the space. In such an arrangement, the longitudinal space forms an air flow passage which narrows towards the carburetor, and thus, provides improved cooling performance for the carburetor. Furthermore, by locating the radiator in front of the engine, it has good contact with the outside air.

A motorcycle having a frame as discussed above preferably further comprises a rear swing arm formed by casting and pivotally mounted at the rear of the frame and supporting a rear wheel, the rear swing arm includes a transverse section in the form of an inverted "U" and is reinforced by at least one integrally cast longitudinal rib located in the space defined by the inverted "U", such a rib extends substantially from the front to the rear of the rear swing arm. The longitudinal rib stiffens the rear swing arm against bending in the longitudinal direction, so that the wall thicknesses of the rear swing arm can be maintained small. The rear swing arm is preferably cast by aluminum die casting, and as discussed above, it is advantageous to avoid thick castings both to reduce weight and to minimize the risk of cavities in the casting.

Thus, viewed from another aspect the invention provides a rear swing arm for a motorcycle, the rear swing arm being formed by casting, having a transverse section in the form of an inverted "U", and being reinforced by at least one integrally cast longitudinal rib located in the space defined by said inverted "U", such rib extending substantially from the front to the rear swing arm.

The rear swing arm will normally be fork shaped, having a pair of arm portions adapted to receive a rear wheel therebetween, and in such an arrangement a longitudinal rib will normally be provided in each arm portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a cross-sectional view taken along line VI—VI in FIG. 3;

FIG. 7 is a cross-sectional view taken along line VII—VII in FIG. 3;

FIG. 8 is a cross-sectional view taken along line VIII—VIII in FIG. 3;

FIG. 9 is a cross-sectional view taken along line IX—IX in FIG. 3;

FIG. 20 is an exploded perspective view showing part of a further embodiment of a rear swing arm.

DETAILED DESCRIPTION OF THE INVENTION

Figure 1:
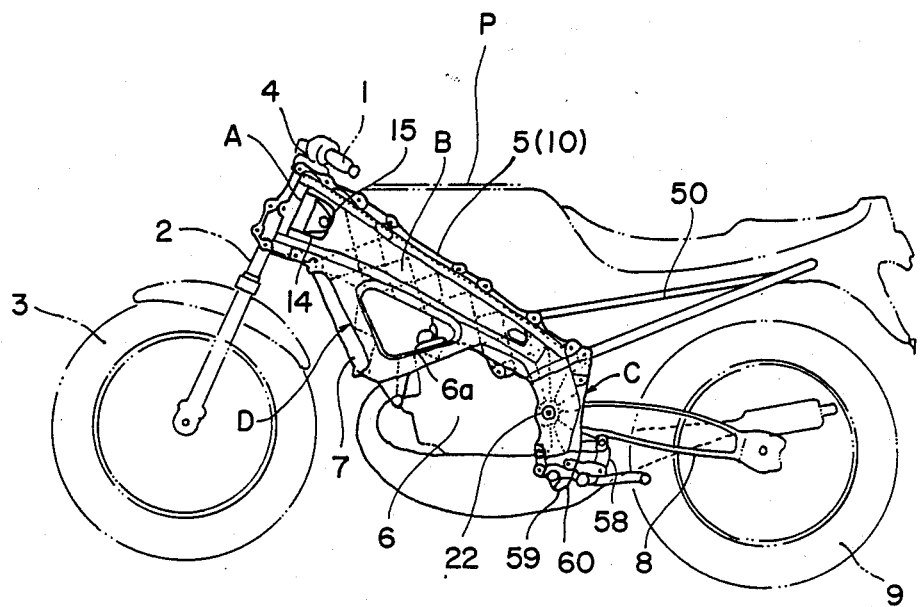
FIG. 1 is a side view of a motorcycle.
Figure 2:
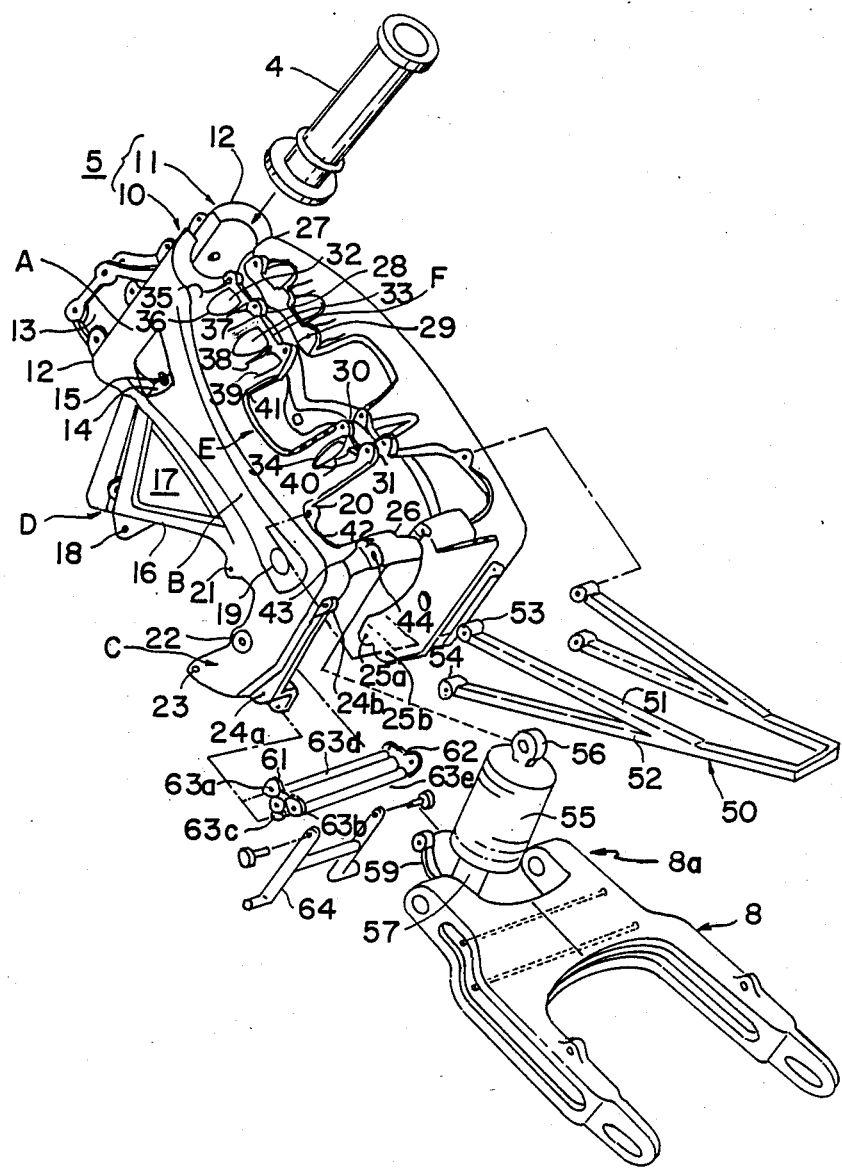
FIG. 2 is an exploded perspective view of a vehicle body frame and the parts to be attached thereto.
Figure 3:
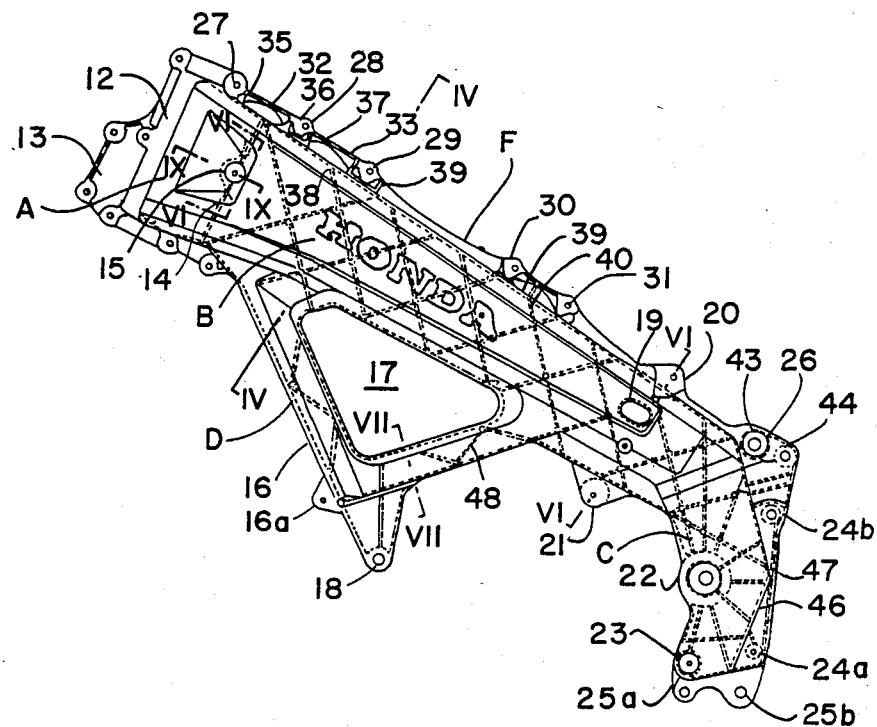
FIG. 3 is a side view of the vehicle body frame.

FIGS. 1 to 5 show an embodiment of the present invention. The motorcycle shown in FIG. 1 includes a handle bar 1, a front fork 2, and a front wheel 3. The front fork 2 is mounted on a front end portion of a vehicle body frame 5 through the intermediary of a head pipe 4. A resin cover P is mounted above the vehicle body frame 5 and covers a fuel tank (not shown).

The vehicle body frame 5 is of a diamond type and on its lower portion is hung and supported an engine 6 in front of which a radiator 7 is mounted. A rear swing arm 8 is pivotably mounted on a rear portion of the vehicle body frame 5.

The vehicle body frame 5 is constituted by left and right divided frame parts 10 and 11 which are bolted together to present a generally inverted "U" shape in section, the "U" opening downward. (See FIG. 4.) Each of the frame parts 10 and 11 is an integral casting made by aluminum die casting and has an average thickness of 2.5 mm which is the most advantageous when taking into account the interrelationship between forming performance and strength.

Further, since the dividing frame parts 10 and 11 are mirror images of each other about an axis of symmetry extending along the longitudinal centerline of the motorcycle and thus have corresponding parts and features, the following description will be made in relation to the frame part 10 (the left side). Accordingly, parts and features of the right frame part 11 are denoted by the same reference numerals as those of the left frame part 10.

The frame part 10 consists of a front portion A, a main frame portion B which supports the engine 6, a rear swing arm supporting portion C formed at an angle to the rear of the main frame portion B, and a downwardly projecting portion D extending beneath the main frame portion B. Further, an upper surface of the main frame portion B extends laterally so as to form an upper wall surface E. A longitudinally extending mating portion F is formed at the inner edge of the upper wall and has an upright mating surface for engagement with a corresponding mating surface of the other frame part 11.

On the front portion A is provided a heat pipe mounting portion 12 which is semicylindrical in shape in order to embrace the head pipe 4. At the front of the head pipe mounting portion 12 is formed a connecting portion 13 provided with a plurality of bosses for fastening respective bolts. To the rear of the head pipe mounting portion 12 an opening through the side wall of the front portion A defines a duct 14 adapted to take in outside air during traveling and to serve as a heat exhaust portion of the radiator 7 when the motorcycle is stationary. A boss 15 for receiving a fastening bolt is formed in the duct 14.

The downwardly projecting portion D is formed by a triangular truss member 16 extending down from the main frame portion B. Inside the truss member 16 is formed an opening 17 which serves as an air exhaust port of the radiator 7 mounted on a bracket 16a provided on a front portion of the truss member 16 and as a maintenance port for a cylinder head portion 6a of the engine. Also, on the lower end portion of the truss member 16 an engine hanger 18 is formed.

On a side surface of the main frame portion B, a longitudinally extending step portion is formed which is capable of having letters or other characters cut thereon.

In a rear side of the main frame portion B, an opening 19 serves as a port for adjusting an upper portion of a carburetor (now shown). A mounting boss 20 and an engine hanger 21 are formed on the frame portion B, respectively, above and below the opening 19.

The rear swing arm supporting portion C extends downwardly from the rear end of the main frame portion B. The rear swing arm supporting portion C is provided in a central position with a pivot mounting hole 22. It is also formed with an engine mounting hole 23, a mounting hole 24a for a footrest holder (not shown) and main stand mounting holes 25a and 25b at its lower portion. A rear cushion unit mounting portion 26 is formed in an upper region of the rear swing arm supporting portion C. Beneath the rear cushion unit mounting portion 26, the portion C has a boss portion 24b for attaching another part of the footrest.

On the upper wall surface E bosses 27 to 31 are longitudinally spaced along the mating portion F, and between adjacent bosses bulging reinforcing portions 32 to 34 are provided. Further, each of bosses 27 and 29 is reinforced by ribs 35 to 39. The reinforcing portion 32 is located between the ribs 35 and 36 while the reinforcing portion 33 is located between the ribs 37 and 38. A reinforcing rib 40 is provided centrally of the bulging reinforcing portion 34.

Between the bosses 29 and 30 of the upper wall surface E, a generally "U" shaped cutout portion 41 is formed which provides an engine adjusting port when the left and right frame parts 10 and 11 are brought together. To the rear of the mounting boss 31 there is provided another generally "U" shaped cutout portion 42 for forming a carburetor adjusting port. On a rear edge of the cutout portion 42, the rear cushion unit mounting portion 26 is formed. This portion has an increased thickness to provide a reinforced region where a transverse hole 43 for mounting a rear cushion unit 55 and a transverse connecting hole 44 for connecting the left and right frame parts 10 and 11 are formed. At the base of the "U" of the cutout portion 42 a mounting boss 20 for the seat rail 50 is provided.

A plurality of ribs are formed inside the side surface of the frame part 10. The front portion A and the main frame portion B are designed to have an array of intersecting ribs 45 to form a generally lozenge shaped grid, whereby the ribs become wide in section and lead to a high strength structure similar to a honeycomb structure.

The rear swing arm supporting portion C is mainly reinforced by ribs 46 formed radially with the pivot mounting hole 22 as a center and further, partially, is provided with a rib 47 crossing the ribs 46. The density of rib distribution is arranged according to the required strength, and is so constituted that the density is greatest in the rear swing arm supporting portion C having the pivot mounting hole 22 and the rear cushion unit mounting portion 26 and is the least in the main frame portion B. Also, on the downwardly projecting portion D is formed an array of ribs 48 which are generally triangular in shape.

Figure 5:
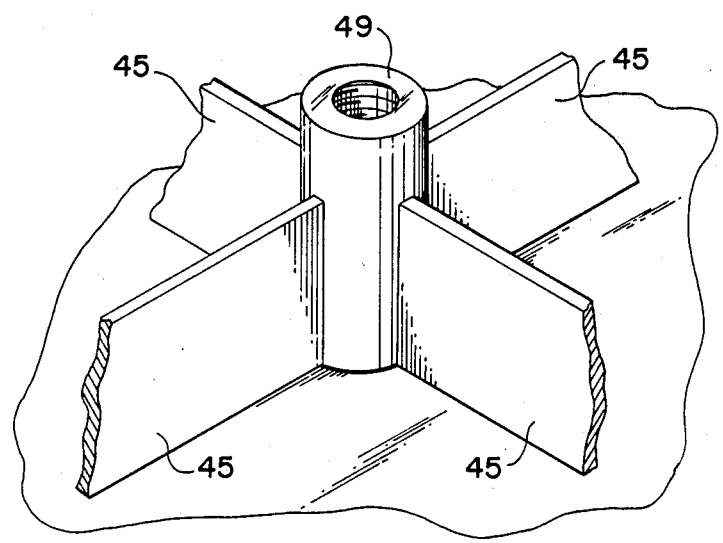
FIG. 5 is a perspective view of the intersection of reinforcing ribs provided on the vehicle body frame.

At the intersection points of the ribs (for example, the ribs 45) is formed a boss like rib cross portion 49 as shown in FIG. 5, if necessary. This rib cross portion 49 projects beyond the maximum projection level of the ribs 45, whereby it contributes to shrinkage prevention after forming. This rib cross portion 49 can be utilized as a mounting boss for attaching electric equipment or the like.

Further, although the ribs 45 and 46 are shown respectively in a lozenge shape and a radiant shape, these shapes are not essential and for example, they can be constituted in a grid shape by means of parallel, longitudinal and transverse ribs. In such an arrangement, the density of rib distribution may also be selected according to the required strength.

The parts to be attached to the vehicle body frame 5 will now be described. First, the seat rail 50 consists of a main pipe 51 and a reinforcing pipe 52 are each provided with a mounting end portion 53 and 54. These mounting end portions 53 and 54 correspond respectively to the mounting boss 20 and the connecting hole 44 of the body frame 5.

A rear cushion unit 55 is centrally located in a space formed at the front of the rear swing arm 8. An upper mounting end portion 56 of the rear cushion unit 55 is adapted to be secured to the rear cushion unit mounting portion 26. A lower mounting end portion 57 is connected to the bottom of the rear swing arm 8 by a bell crank 58, one end of a link 59 connected to the bell crank 58 being fastened together with a main stand described hereinafter.

The main stand 60 has a pair of brackets 61 and 62 in which mounting holes 63a and 63b corresponding to the main stand mounting holes 25a and 25b and a stand leg mounting hole 63c are formed. Also, between the brackets 61 and 62 are load cross pipes 63d and 63e. One end portion of the link 59 is attached to the cross pipe 63e by a pin. In the stand leg mounting hole 63c is attached an upper end portion of a stand leg 64 by a pivot.

The assembly of the vehicle body frame 5 and the parts to be attached thereto will now be described. First, the head pipe 4 is inserted into the head pipe mounting portion 12 and the divided frame parts 10 and 11 are brought together. After this, each of the boss portions 13, 15 are 27 to 31 are joined by means of bolts. The mounting portion 53 of the seat rail 50 is secured to the mounting boss 20 by means of a bolt and the mounting end portion 54 of the seat rail 50 is secured by a bolt which passes through the left and right connecting holes 44. By this, the rigid vehicle body frame 5 is assembled to open downward and to form a generally inverted "U" shape in section. Also, the pivot portion 8a of the rear swing arm 8 is aligned with the pivot mounting hole 22 and connected by a pivot. The end portion of the link 59 is attached to the vehicle body frame 5 by utilizing the cross pipe 63e. The upper mounting end portion 56 of the cushion unit 55 is inserted between the left and right bosses 43 and is secured by a bolt therein.

Similarly, the brackets 61 and 62 are respectively attached to the frame 5 by alignment of the mounting holes 63a and 63b with the left and right main stand mounting holes 25a and 25b and insertion of suitable bolts.

The ribs in the present embodiment are distributed most densely in the rear swing arm supporting portion C. Accordingly, the rigidity is the highest at the rear swing arm supporting portion C of the vehicle body frame 5. In general, the maximum load is applied to the pivot mounting hole 22 and the cushion unit mounting portion 26 formed in the rear swing arm supporting portion C through the intermediary of the rear swing arm 8 and the cushion unit 55. However, by virtue of the higher density ribs, the structure is sufficiently strong and rigid to resist such concentrated loads.

Thus, it will be seen that in the frame described above, since reinforcing ribs are arranged to be most densely distributed at least near the rear swing arm supporting portion the vehicle body frame can be relatively thin as a whole so as to be lightweight while still providing a sufficiently rigid structure to satisfy strength requirements.

Figure 4:
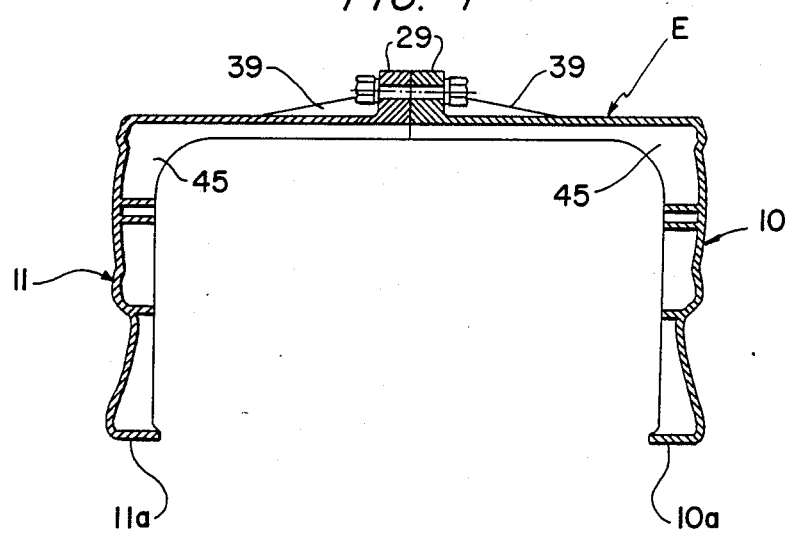
FIG. 4 is a cross-sectional view taken along line IV—IV in FIG. 3.

The openings in the vehicle body frame 5 shown in further detail in FIGS. 6 to 9 will now be described. Each opening provides a hole for the purposes previously described and is also effective to reduce the overall weight of the frame. At the edge of each opening there is formed a re-entrant rib which is directed inwardly substantially at a right angle to the frame outer surface. For example, as shown in FIGS. 6 to 8 at the respective edges of the openings 14, 17 and 19 are formed the inwardly directed ribs 14a, 17a and 19a, thereby to increase rigidity. Therefore, by virtue of these ribs 14a, 17a and 19a, each of the openings 14, 17 and 19 can be formed without reducing the rigidity of the frame. Also, as shown in FIGS. 4 and 8, at the lower edge of the main frame there are provided inwardly directed re-entrant portions 10a, 11a and 16b which contribute to the rigidity of the frame. Also for this purpose, upwardly directed portions are formed at the peripheral edges of the openings 41 and 42 provided in the upper wall surface E.

Referring to FIG. 9, the duct 14 is in alignment with the connecting portion 15 provided inwardly thereof. The opening of the duct 14 allows insertion from the outside of a bolt 15a and a connecting tool 15b, such as a box wrench or the like. Furthermore, when the left and right divided frame parts 10 and 11 are connected at the connecting boss portion 15, because it is located near the head pipe 4, the connecting boss portion 15 contributes to a firm retention of the head pipe 4. The duct 24 also contributes to an attractive external appearance of the vehicle body frame 5.

It will thus be seen that the openings in the cast frame are reinforced at their edges by re-entrant ribs, so that the frame maintains its overall rigidity in the required range, while the portions of the frame wall which are, in effect, omitted where the openings are formed mean that the frame can be lightweight. Furthermore, one of such openings is formed as a duct which provides access to a portion for connecting the two frame parts together so that a tool may be inserted in the duct to secure together the frame parts, the duct also functioning as a cooling air inlet port. In addition, a secure mounting is provided for the head pipe.

Figure 10:
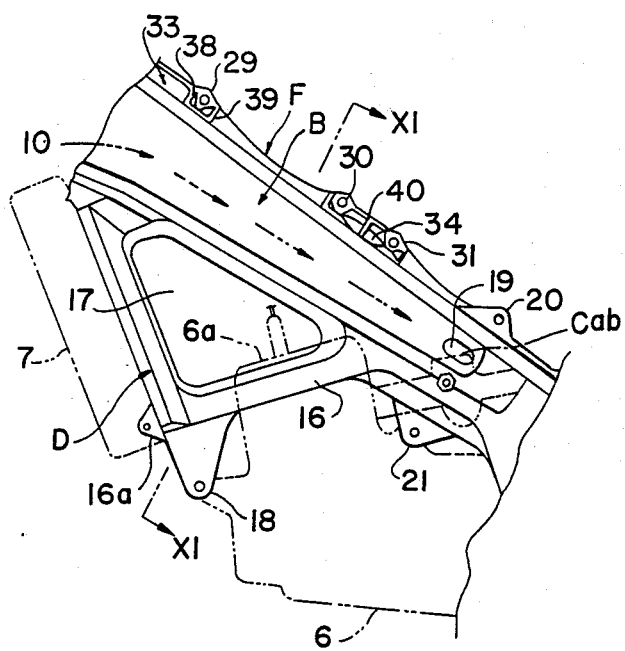
FIG. 10 is an enlarged side view of part of the vehicle body frame.
Figure 11:
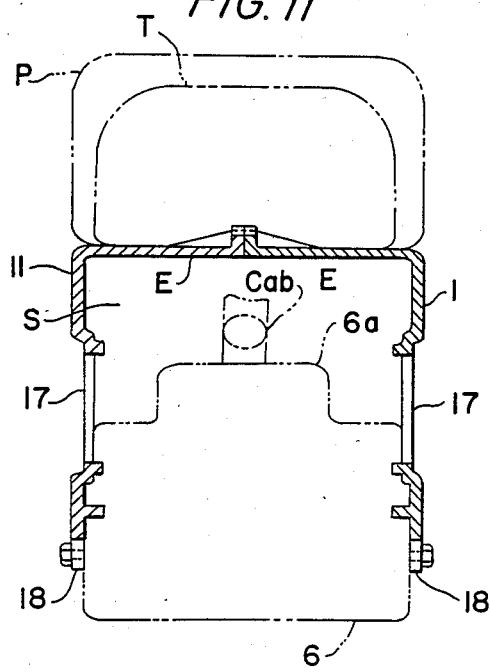
FIG. 11 is a cross-sectional view taken on the lines XI—XI of FIG. 10.

FIGS. 10 and 11 show a mounting arrangement for the engine 6. In such a mounting arrangement, the upper wall surface E is located between the fuel tank T and the engine 6 to form a partition when the frame parts 10 and 11 are integrally connected with each other.

A periphery of the fuel tank T is covered by the cover P of synthetic resin. Also, a space S is formed beneath the upper wall surface E which is surrounded by the side surfaces of the left and right frame parts 10 and 11 and the engine 6 and which is formed such that its sectional area reduces gradually towards the rear of the vehicle. A cylinder portion 6a of the engine 6 is arranged in the space S supported by the engine hanger 18 or the like. Also, as shown in FIG. 10, the radiator 7 is mounted on a bracket 16a provided on the truss member 16 in front of the engine 6. Behind the cylinder portion 6a, the carburetor Cab is arranged to be located in the space S.

The function of the parts shown in FIGS. 10 and 11 will now be further described. Since the upper wall surface E is provided on the vehicle body frame 5 this portion functions as a shield plate to prevent heat transmission from the engine to the fuel tank. The engine 6 can, therefore be arranged closer to the upper wall surface E than the arrangements of the prior art and the vehicle body is compact in the vertical direction.

Also, the vehicle body frame 5 is not formed of a pair of laterally spaced tubular members as known in the prior art, but rather the side surfaces of the frame parts 10 and 11 are formed as plate like members with a relatively large lateral dimension therebetween. This space is used to house the engine and thus the transverse width of the vehicle body, defined by the outer side surfaces of the frame parts, can be retained small.

Further, due to the presence of the upper wall surface E, the space S functions as an air flow passage. Therefore, as shown in FIG. 10, outside air taken into the space S through the duct 14 or the like flows rearwardly in the space S along this air flow passage. Since the space S is formed gradually to reduce in sectional area in the rearward direction, the flow of outside air is concentrated on the carburetor Cab. Accordingly, the latter is cooled with good efficiency. Also, since the radiator 7 is arranged at the front of the space S, it is possible to ensure a large contact surface with the outside air.

Figure 12:
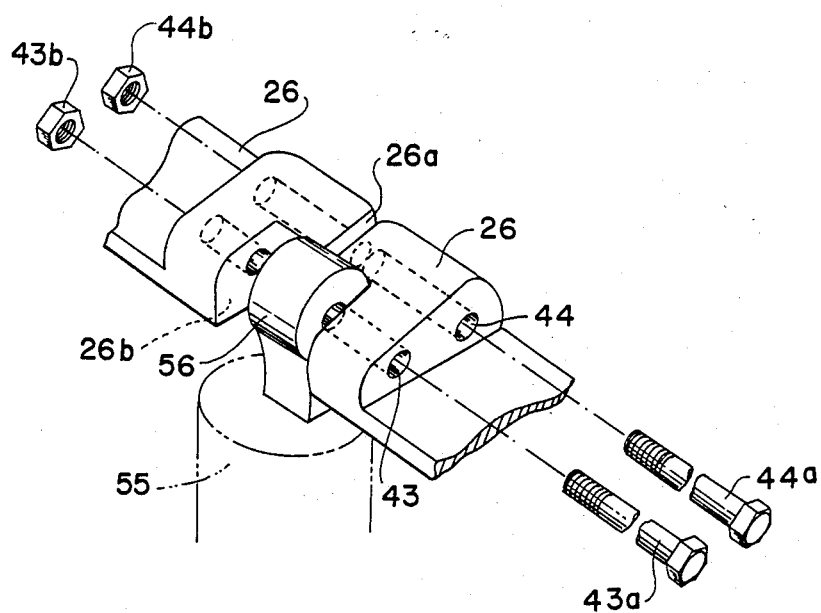
FIG. 12 is an exploded perspective view showing the rear of the vehicle body frame.
Figure 13:
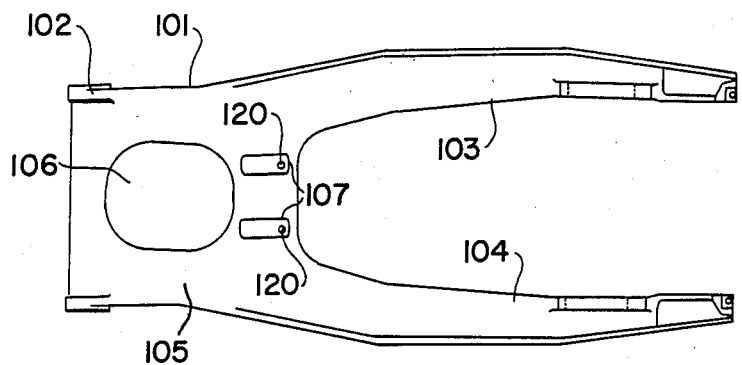
FIG. 13 is a top plan view of a rear swing arm in accordance with the invention.
Figure 14:
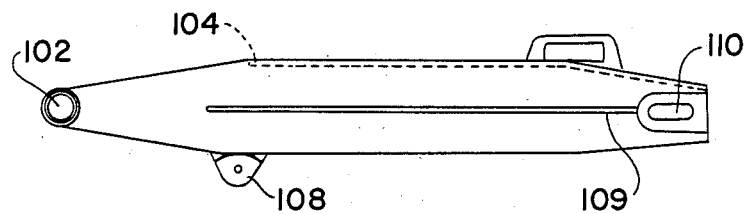
FIG. 14 is a side view of the rear swing arm.
Figure 15:
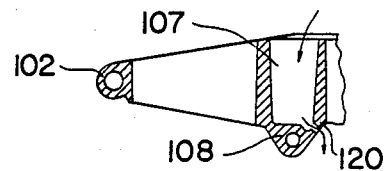
FIG. 15 is a cross-sectional view of the rear swing arm.

FIG. 12 shows a mounting arrangement for the upper mounting end portion 56 of the rear cushion unit 55. A recess 26b is formed in the mating surface 26a of the rear cushion unit mounting portion 26 of each frame part. The recesses 26b of the two frame parts together define a pace for containing the upper mounting end portion 56 of the rear cushion unit 55. The upper mounting end portion 56 contained in the space is fastened to the rear cushion unit mounting portion 26 by a bolt and nut connection, namely bolt 43a passing through the transverse mounting hole 43 and a nut 43b.

The connecting holes 44 formed in the left and right rear cushion unit mounting portions 26 are aligned and connected by means of a bolt 44a and a nut 44b. At the same time the mounting portion 54 of the seat rail 50 is secured (not shown in FIG. 12.)

The operation of the parts shown in FIG. 12 will now be described. The load applied during the up and down movement of the rear swing arm 8 (see FIG. 2) is transmitted from the lower mounting end portion 57 to the upper mounting end portion 56 through the intermediary of the rear cushion unit 55 by means of the link mechanism consisting of the link 59 and the bell crank 58 (see FIG. 1) and further, is transmitted from the upper mounting end portion 56 to the rear cushion unit mounting portion 26. Since the latter is integral with the frame parts 10 and 11 and has a thick and highly rigid structure, the stress is not concentrated on the rear cushion unit mounting portion 26 and the load is dispersed over the whole vehicle body frame 5.

Also, since the rear cushion unit mounting portion 26 is formed at the mating surface 26a, the distance of the supporting point for the upper mounting end portion 56 (i.e., the axis of the bolt 43) from the connection between the frame parts (bolt 44) is relatively short so that bending stresses on the mounting portion 26 are kept to a minimum. This enables further lightening of the vehicle body frame.

Moreover, since the dimensions of the rear cushion unit mounting portion 26 can be freely controlled according to a mould shape on casting, its strength can be assured. Further, since the mounting of the upper mounting end portion 56 utilizes the recesses 26b formed on the mating surfaces 26a, such mounting requires a bolt 43a and a nut 43b without necessitating a separate bracket or the like. In addition, since the rear swing arm supporting portion C is formed integrally with the main frame portion B, the number of parts is reduced as compared to the prior art.

It will thus be seen that the rear cushion unit mounting portion is formed integrally by utilizing the mating surfaces of the left and right frame parts so as to mount the upper mounting end portion of the rear cushion unit directly thereon, so that it is possible for loads to be dispersed and absorbed better over the whole vehicle body frame without excessive load concentration on the rear cushion unit mounting portion. Moreover, the assembly operation is easy, since separate parts, such as the cross pipe and brackets normally provided for supporting the rear cushion unit, are not required.

FIGS. 13 to 18 show one embodiment of a rear swing arm in accordance with the present invention. The rear swing arm 101 comprises a pivot portion 102 adapted to be mounted on a rear portion of a vehicle body frame (not shown), laterally spaced arm portions 103 and 104 which extend rearward in a fork like shape and which support a rear wheel (not shown), and a cross plate 105 which is formed near the pivot portion 102 and which connects integrally the left and right arms 103 and 104.

In the cross plate 105 is formed a rear cushion mounting hole 106 extending through the cross plate 105 in the vertical direction. An annular rib 106a is provided on the underneath surface of the cross plate 105 to define the periphery of the mounting hole 106 and to increase rigidity.

Rearwardly of the mounting hole 106 and adjacent the arm portion 103 and 104 are formed holes 107 for providing a link mounting boss of a rear cushion unit. At the bottom of the hole 107 a boss 108 projects downward from the underneath surface of the rear swing arm. (See FIG. 15). At the bottom of the hole 107 there is also a water drainage opening 120 extending downwardly and rearwardly.

Centrally of a side surface of the rear swing arm 101 a parting line 109 is formed by upper and lower dividing moulds during die casting. When the parting line 109 is provided at this position, stress concentration in the rear swing arm is minimized to provide advantages in strength. At the rear ends of the arm portions 103 and 104 are formed holes 110 for attaching an axle of the rear wheel (not shown).

Figures 16, 17:
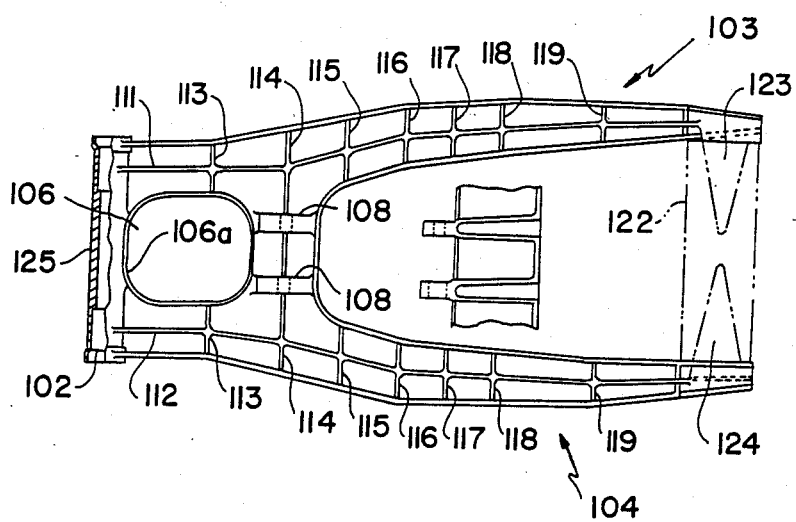
FIG. 16 is an underneath plan view of the rear swing arm.
FIG. 17 is a longitudinal cross-sectional view of the rear swing arm.

The rear swing arm 101 is a single integral casting formed by aluminum die casting and has an average wall thickness of 2.5 mm. As shown in FIGS. 16 and 17, the rear swing arm is formed in a generally inverted "U" shape. As a result of this downwardly opening arrangement mud or other debris tends to fall naturally from the swing arm.

In the inverted "U" shape space underneath the rear swing arm 101 are formed grid like ribs extending longitudinally and transversely. More particularly, longitudinal ribs 111 and 112 extend respectively from the pivot portion 102 through a central region of the arm portions 103 and 104 to their rear ends. Further, transverse ribs 113 and 119 are arranged perpendicular to and intersecting the longitudinal ribs 111 and 112.

Further, as shown in FIG. 17, the lower edge of each of the transverse ribs is formed to be at the same level as the lower edge of the longitudinal rib 112 (111). This improves the strength of the swing arm.

As shown by two dotted lines in FIG. 16, immediately after forming an extra cross member is provided at the rear ends of the arm portions 103 and 104. Inside the cross member 112 lifting holes 123 and 124 are formed by slide moulds.

Figure 18:
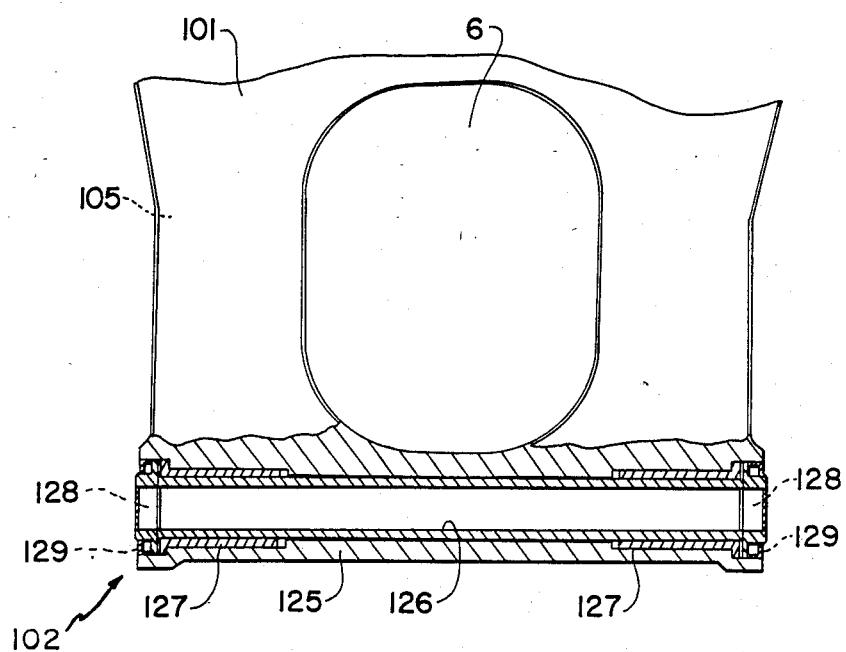
FIG. 18 is a partial cross-sectional view of the rear swing arm.

The pivot portion 102, as shown in FIG. 18, is so constituted that a sleeve 126 is fitted into a cylindrical member 125 formed at the front of the cross plate 105. On outer peripheries of both ends of this sleeve 126 are formed bushes 127, respectively, and adjacent each end of the sleeve 126 a respective flange like collar 128 is provided. A seal ring 129 is located against the flange of each collar 128 and engages an inner peripheral portion of the cylindrical member 125. Integrally with the seal ring 129 is embedded a metal resilient member having an "L" shape in section. One reason that the seal ring 129 is fitted into the cylindrical portion 125 is that the outer diameter of the cylindrical portion is relatively large to ensure strength, because the rear swing arm 102 is formed by casting, and thus a cap like seal member of the type used in the prior art (see FIG. 19) would be undesirably large.

The method of manufacturing the rear swing arm 101 will now be described. First of all, as shown in FIG. 16, the rear swing arm 101 is cast by aluminum to have an average wall thickness of 2.5 mm and having the integral cross member 122. Thereafter, a hollow hole of the pivot portion 102 and an axle mounting hole 110 are formed by machining. Further, at a stage after shrinkage of the material has occurred, the cross member 122 is cut by machining and is removed. By this process, the rear swing arm 101 is formed in the required shape. Thus, by providing the cross member 122, it is possible effectively to prevent deformation due to shrinkage of the arm portions 103 and 104 and to obtain a product having very high working accuracy.

In use of the rear swing arm, regardless of the relatively thin wall having an average thickness of 2.5 mm, sufficient strength is provided because the grid like ribs 111 to 119 are formed longitudinally and transversely. In particular, since the longitudinal ribs 111 and 112 are arranged to continue from the rear end of each of the arm portions 103 to 104 to the pivot portion 102, bending stresses on each of the arm portions 103 and 104 during up and down movement of the rear wheel are resisted by the reinforcing effect of the longitudinal ribs.

Moreover, since in the bottom of the upwardly open hole 107, a water drain hole 120 is formed which slants down and rearward, if rain gathers in the hole 107, it is exhausted naturally from this water drain hole 120 to the outside. When the vehicle is not being ridden, the rear swing arm 101 is designed to slope downwardly towards its rear end, further improving the tendency of rain to drain from the water drain hole 120.

Figure 19:
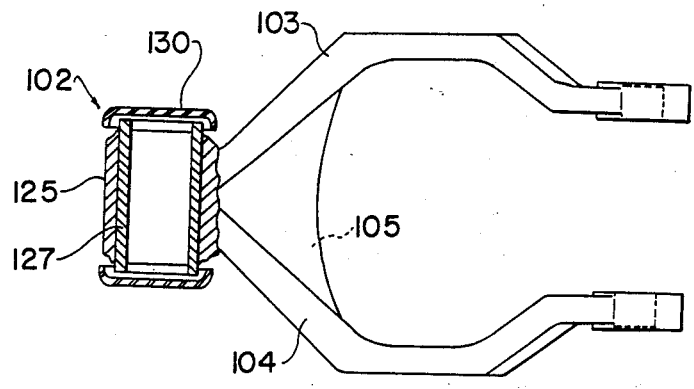
FIG. 19 is a plan view, partly in section, of another embodiment of the rear swing arm.

FIG. 19 shows another embodiment of rear swing arm. In the following description, the same reference numerals are used for parts having the same functions as corresponding parts of the previous embodiment. In this embodiment, the transverse width of the pivot portion 102 is relatively narrow, while the forked arm portions 103 and 104 expand transversely in the rearwardly extending direction. According to such an arrangement, a single bushing 127 extends from left to right in an advantageous manner and includes a cap-like seal member 130.

In the embodiment shown in FIG. 20, a rear swing arm is constituted by an aluminum die casting having divided upper and lower portions. An upper member 131 and a lower member 132 are each formed to have an open section and are connected by means of a bolt 133 and a nut 134 after mating together the open sections. Integral longitudinal ribs 135 and 136 as well as an appropriate number of transverse ribs 137, 138, 139, 140, 141 and 142 are formed in the upper and lower members 131 and 132 similar to those of the previous embodiment. The ribs of the upper and lower members mate to define a number of divided chambers between the ribs. In the bottom portions of these divided chambers are formed communicating bores 143, 144, 145 and 146 at the rear thereof so that water can drain from each chamber.

Since the rear swing arms described above are formed generally in an inverted "U" shape in transverse section with longitudinally extending ribs, it is possible to improve rigidity, particularly in the longitudinal direction where bending stresses are highest. Thus the rear swing arm may be formed as a relatively thin member made from aluminum die casting while having sufficient rigidity in use.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A vehicle body frame for a motorcycle comprising:
   a casting frame including a main frame portion for supporting an engine;
   said casting frame being divided into a right and a left structure; and
   said right and left structures being joined about a center line of the vehicle body for forming a vehicle body frame having a generally U-shaped configuration wherein the open portion of the U-shaped configuration is formed to open downwardly; and
   a downwardly projecting portion depending from said main frame portion, wherein said downwardly projecting portion supports the engine.

2. The vehicle body frame for a motorcycle according to claim 1, and further including a rear swing arm supporting portion having a plurality of reinforcing ribs;
   said ribs being positioned for increasing the strength of said rear swing arm and being disposed to be densely arranged in at least an area adjacent to the rear swing arm supporting portion.

3. The vehicle body frame for a motorcycle according to claim 2, wherein said rear swing arm supporting portion is cast as an aluminum die casting.

4. The vehicle body frame for a motorcycle according to claim 1, wherein an edge portion of said right and left structures is formed to be of an increased thickness in an area adjacent to said downward opening relative to the remaining portions of the right and left structures.

5. The vehicle body frame for a motorcycle according to claim 1, wherein an air intake duct is formed in an outer surface of one of the right or left structures and a connecting portion is provided on said right structure for connection with the left structure, wherein the duct is arranged such that a tool may be passed therethrough to gain access to the connecting portion.

6. The vehicle body frame for a motorcycle according to claim 5, wherein the duct has a periphery defined by a re-entrant rib.

7. The vehicle body frame for a motorcycle according to claim 1, wherein each right and left structure is provided at its rear with an integral thickened region arranged such that when the right and left structures are connected together, the thickened regions unite to define a mounting portion for a rear cushion unit, wherein a space is defined between the thickened regions for supporting an upper end of the rear cushion unit.

8. The vehicle body frame for a motorcycle according to claim 1, and further including an upper wall arranged to receive a fuel tank thereon, wherein in use the upper wall provides a separating partition between the fuel tank and an engine supported below the wall.

9. The vehicle body frame for a motorcycle according to claim 1, wherein the engine is disposed below an upper wall of said frame to define a longitudinal space between the upper wall and the engine which reduces in transverse sectional area towards the rear of the frame and further including a radiator being disposed in front of the engine; and
a carburetor at the end of said space.

10. The vehicle body frame for a motorcycle according to claim 1, and further including a rear swing arm formed by casting and pivotally mounted at the rear of the frame and supporting a rear wheel, the rear swing arm having a transverse section in the form of an inverted "U" and being reinforced by at least one integrally cast longitudinal rib in the space defined by said inverted "U", such rib extending substantially from the front to the rear of the rear swing arm.

11. A vehicle body frame for a motorcycle comprising:

a cashing frame including a main frame portion for supporting an engine;

said casting frame being divided into a right and left structure;

said right and left structures being joined about a center line of the vehicle body for forming a vehicle body frame having a generally U-shaped configuration wherein the open portion of the U-shaped configuration is formed to open downwardly; and a rear swing arm supporting portion having a plurality of reinforcing ribs;

said ribs being positioned for increasing the strength of said rear swing arm and being disposed to be densely arranged in at least an area adjacent to the rear swing arm supporting portion.

12. The vehicle body frame for a motorcycle according to claim 11, wherein said rear swing arm supporting portion is cast as an aluminum die casting.

13. The vehicle body frame for a motorcycle according to claim 11, wherein an edge portion of said right and left structures is formed to be of an increased thickness in an area adjacent to said downward opening, relative to the remaining portions of the right and left structures.

14. The vehicle body frame for a motorcycle according to claim 11, wherein an air intake duct is formed in an outer surface of one of the right or left structures and a connecting portion is provided on said right structure for connection with the left structure, wherein the duct is arranged such that a tool may be passed therethrough to gain access to the connecting portion.

15. The vehicle body frame for a motorcycle according to claim 14, wherein the duct has a periphery defined by a re-entrant rib.

16. The vehicle body frame for a motorcycle according to claim 11, wherein each right and left structure is provided at its rear with an integral thickened region arranged such that when the right and left structures are connected together, the thickened regions unite to define a mounting portion for a rear cushion unit, wherein a space is defined between the thickened regions for supporting an upper end of the rear cushion unit.

17. The vehicle body frame for a motorcycle according to claim 11, and further including an upper wall arranged to receive a fuel tank thereon, wherein in use the upper wall provides a separating partition between the fuel tank and an engine supported below the wall.

18. The vehicle body frame for a motorcycle according to claim 11, and further including an engine disposed below an upper wall of said frame to define a longitudinal space between the upper wall and the engine which reduces in transverse sectional area towards the rear of the frame;

a radiator being disposed in front of the engine; and
a carburetor at the rear of said space.

19. The vehicle body frame for a motorcycle according to claim 11, and further including a rear swing arm formed by casting and pivotally mounted at the rear of the frame and supporting a rear wheel, the rear swing arm having a transverse section in the form of an inverted "U" and being reinforced by at least one integrally cast longitudinal rib in the space defined by said inverted "U", such rib extending substantially from the front to the rear of the rear swing arm.

* * * * *